(12) United States Patent
Mizusawa

(10) Patent No.: US 10,338,562 B2
(45) Date of Patent: Jul. 2, 2019

(54) NUMERICAL CONTROLLER, CONTROL SYSTEM, CONTROL METHOD, AND CONTROL PROGRAM

(71) Applicant: FANUC CORPORATION, Minamitsuru-gun, Yamanashi (JP)

(72) Inventor: Kazuyasu Mizusawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/692,563

(22) Filed: Aug. 31, 2017

(65) Prior Publication Data

US 2018/0067473 A1  Mar. 8, 2018

(30) Foreign Application Priority Data

Sep. 5, 2016 (JP) .................. 2016-172706

(51) Int. Cl.
| | | |
|---|---|---|
| G05B 19/408 | (2006.01) | |
| G05B 19/401 | (2006.01) | |
| G05B 19/18 | (2006.01) | |
| G05B 19/409 | (2006.01) | |
| G05B 19/414 | (2006.01) | |
| G05B 19/4155 | (2006.01) | |
| G05B 19/418 | (2006.01) | |

(52) U.S. Cl.
CPC ....... *G05B 19/4015* (2013.01); *G05B 19/182* (2013.01); *G05B 19/408* (2013.01); *G05B 19/409* (2013.01); *G05B 19/414* (2013.01); *G05B 19/4155* (2013.01); *G05B 19/41865* (2013.01); *G05B 19/41825* (2013.01); *Y02P 90/087* (2015.11); *Y02P 90/20* (2015.11)

(58) Field of Classification Search
CPC .......... G05B 19/4015; G05B 19/182; G05B 19/408; G05B 19/409; G05B 19/414
USPC ......................................... 318/569
See application file for complete search history.

(56) References Cited

U.S. PATENT DOCUMENTS 7,054,702 B1 * 5/2006 Barto ............................ 700/100
7,438,192 B1 * 10/2008 Kohler ......................... 209/523
(Continued)

FOREIGN PATENT DOCUMENTS

| JP | 11-232332 | 8/1999 |
|---|---|---|
| JP | 2004-30199 | 1/2004 |

(Continued)

OTHER PUBLICATIONS

Machine translation of JP2012168746A.*

*Primary Examiner* — Kawing Chan
(74) *Attorney, Agent, or Firm* — Wenderoth, Lind & Ponack, L.L.P.

(57) ABSTRACT

To provide a numerical controller, a control system, a control method, and a control program that can realize proper adjustment of a method of machining by each machine tool in a machining step. A numerical controller comprises: a ROM that stores multiple combinations of machining programs and parameters together with a first cycle time required for machining; a receiving unit that receives a second cycle time of a bottleneck step; and a selection unit that selects a combination from the multiple combinations of the machining programs and the parameters. The selected combination is to extend the first cycle time to a range not exceeding the second cycle time.

11 Claims, 5 Drawing Sheets

(56) References Cited

U.S. PATENT DOCUMENTS

| | | | |
|---|---|---|---|
| 2002/0103559 A1* | 8/2002 | Gartstein | 700/99 |
| 2005/0154625 A1* | 7/2005 | Chua | 700/100 |
| 2009/0326996 A1* | 12/2009 | Goh | 705/7.27 |
| 2011/0008964 A1* | 1/2011 | Hughes | 438/692 |
| 2011/0022212 A1* | 1/2011 | Nonaka | G05B 19/4184 700/108 |
| 2013/0122825 A1* | 5/2013 | Deforge | 455/73 |

FOREIGN PATENT DOCUMENTS

| | | |
|---|---|---|
| JP | 2004-145436 | 5/2004 |
| JP | 2012168746 A * | 9/2012 |
| JP | 2012-243894 | 12/2012 |
| WO | 2014/041686 | 3/2014 |

* cited by examiner

NUMERICAL CONTROLLER, CONTROL SYSTEM, CONTROL METHOD, AND CONTROL PROGRAM

This application is based on and claims the benefit of priority from Japanese Patent Application No. 2016-172706, filed on 5 Sep. 2016, the content of which is incorporated herein by reference.

BACKGROUND OF THE INVENTION

Field of the Invention

The present invention relates to a numerical controller, a control system, a control method, and a control program for controlling multiple machine tools in a series of steps.

Related Art

A numerical controller (CNC device) as an electronic device for controlling a machine tool controls various motors by mainly following a machining program and various parameters to realize machining. More specifically, a motor is used for rotating a spindle to which a cutting tool is attached and rotating an axis for moving a table, etc. where a workpiece is fixed.

A large number of machine tools are installed in a factory as an actual machining site, and each of the machine tools is responsible for machining on various parts. In some cases, multiple machine tools work sequentially for machining on one part. For production of one item, various steps to be done in a factory are prepared, and a time from the start of machining to the completion of the item differs between parts and between the steps. Hence, the processing capacity of the factory as a whole is evaluated in terms of throughput showing processing capacity with which a completed item is produced per unit time.

Throughput is affected not by the length of time from the start to the end of machining but by a bottleneck that is a step taking the longest processing time. Even if production activity in a step not causing a bottleneck is done until the capacity of a factory reaches its limit, process cannot be progressed in the factory as a whole to an extent exceeding a limit of a bottleneck. This causes redundant intermediate materials during the course of production of a completed item or shortens the operating time of a machine tool in a step executed after a bottleneck step. A method of making a production plan for step optimization has been suggested as a technique allowing for a bottleneck (see Patent Documents 1 to 3, for example).

Patent Document 1: Japanese Unexamined Patent Application, Publication No, 2004-30199

Patent Document 2: Japanese Unexamined Patent Application, Publication No. 2004-145436

Patent Document 3: Japanese Unexamined Patent Application, Publication No. 2012-243894

SUMMARY OF THE INVENTION

Using each machine tool for machining to the limit of its production capacity has not always been an efficient use of the machine tool. In some cases, reducing a cutting speed has been more preferable in consideration of the lifetime of a tool or power consumption. A numerical controller has a function such as changing an override prepared as a simple method of reducing a machining speed. In consideration of a workpiece surface and the occurrence of chatter, for example, machine tools have generally been required to be adjusted individually for maintaining quality. If a factory includes only a small number of machine tools such as one or several, an operator might be able to make adjustments on an as-needed basis by checking an entire flow. Meanwhile, there are also factories where dozens of machine tools or more need to be installed. In such a case, both a method of adjusting a parameter and a machining program for each machine tool on an as-needed basis and a method of reflecting a predetermined backup take a long time to implement for the operator as a result of the large number of machine tools. Hence, adjustment has been limited to a machine tool obviously determined to have redundant production capacity.

The present invention is intended to provide a numerical controller, a control system, a control method, and a control program that can realize proper adjustment of a method of machining by each machine tool in a machining step.

(1) A numerical controller (numerical controller 1 described later, for example) according to the present invention comprises: a storage unit (ROM 12 described later, for example) that stores multiple combinations of machining programs and parameters together with a first cycle time required for machining; a receiving unit (receiving unit 111 described later, for example) that receives a second cycle time of a bottleneck step; and a selection unit (selection unit 112 described later, for example) that selects a combination from the multiple combinations of the machining programs and the parameters. The selected combination is to extend the first cycle time to a range not exceeding the second cycle time.

(2) The numerical controller according to (1) may comprise a transmission unit (transmission unit 113 described later, for example) that transmits outwardly the first cycle time selected by the selection unit.

(3) The numerical controller according to (1) or (2) may comprise a planning unit (planning unit 114 described later, for example) that moves a machining hour to a predetermined time period if the bottleneck step is downstream from the numerical controller and if a difference between the second cycle time and the first cycle time selected by the selection unit exceeds a threshold.

(4) A control system (control system 100 described later, for example) according to the present invention comprises multiple numerical controllers and a management server (management server 2 described later, for example). Each of the numerical controllers comprises: a storage unit that stores multiple combinations of machining programs and parameters together with a first cycle time required for machining; a receiving unit that receives a second cycle time of a bottleneck machine tool; a selection unit that selects a combination from the multiple combinations of the machining programs and the parameters, the selected combination being one that extends the first cycle time to a range not exceeding the second cycle time; and a transmission unit that transmits outwardly the first cycle time selected by the selection unit. The management server comprises: a collection unit (collection unit 201 described later, for example) that collects the first cycle time from each of the numerical controllers; and a notification unit (notification unit 202 described later, for example) that notifies each of the numerical controllers of a maximum as the second cycle time among cycle times about all steps including the first cycle time collected by the collection unit.

(5) A control method according to the present invention is implemented by a numerical controller that stores multiple combinations of machining programs and parameters together with a first cycle time required for machining. The control method comprises: a receiving step of receiving a second cycle time of a bottleneck step; and a selection step of selecting a combination from the multiple combinations of the machining programs and the parameters. The selected combination is to extend the first cycle time to a range not exceeding the second cycle time.

(6) A control program according to the present invention causes a numerical controller that stores multiple combinations of machining programs and parameters together with a first cycle time required for machining to execute: a receiving step of receiving a second cycle time of a bottleneck step; and a selection step of selecting a combination from the multiple combinations of the machining programs and the parameters. The selected combination is to extend the first cycle time to a range not exceeding the second cycle time.

According to the present invention, a method of machining by each machine tool in a machining step is adjusted properly.

DETAILED DESCRIPTION OF THE INVENTION

Figure 1:
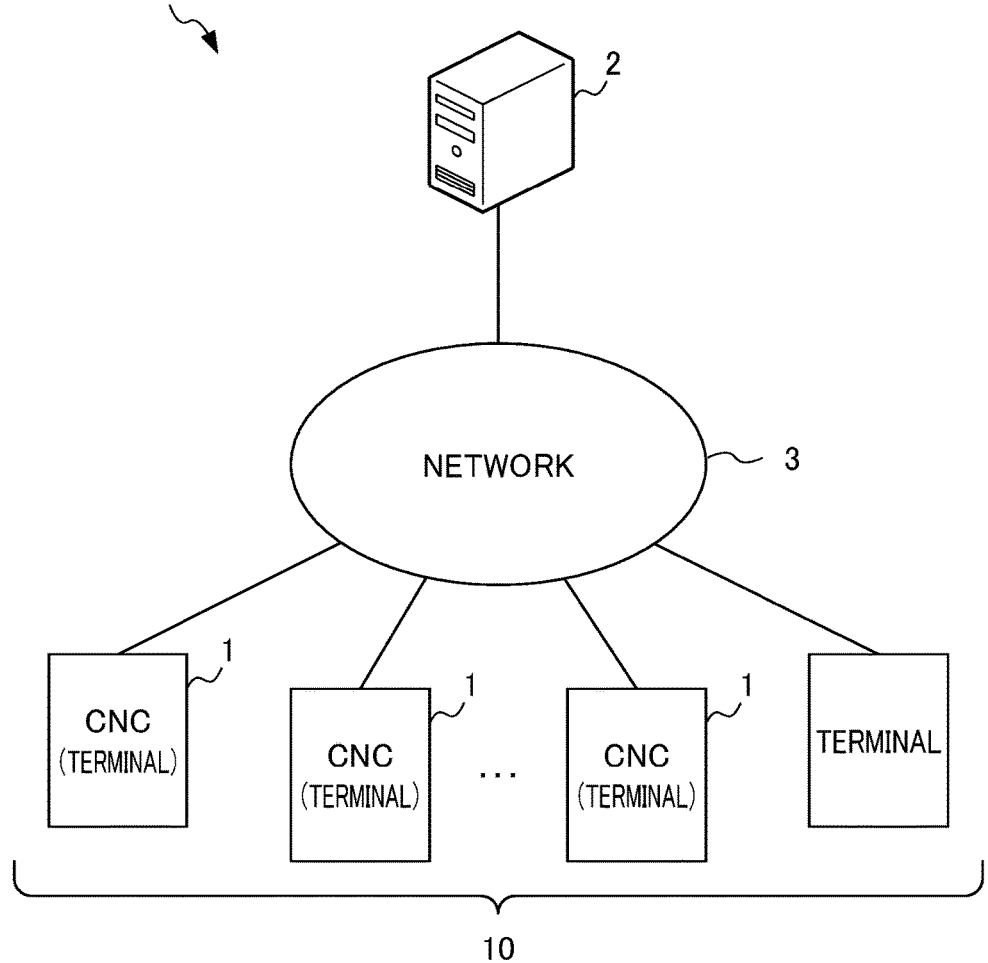
FIG. 1 is a schematic view showing the entire configuration of a control system.

An example of an embodiment of the present invention will be described below. FIG. 1 is a schematic view showing the entire configuration of a control system 100. The control system 100 is configured to include a terminal group 10 with multiple numerical controllers (CNC devices) 1, and a management server 2. The terminal group 10 and the management server 2 are connected through a network 3 such as a local area network (LAN) or the Internet in a manner that allows communication between the terminal group 10 and the management server 2.

The terminal group 10 includes a numerical controller 1 for a machining step. The terminal group 10 may additionally include a terminal provided for a corresponding one of multiple steps to be executed in a factory including an assembly step, a transfer step, and a test step, for example. The numerical controller 1 is one type of the terminal group 10. The numerical controller 1 is provided for each machine tool and controls a servo motor, etc. provided in the machine tool by following a set parameter and a set program. The management server 2 is an information processor that manages the terminal group 10. Each terminal in the terminal group 10 is allowed to transmit and receive various types of data to and from a different terminal through the management server 2, or acquire a result of processing by the management server 2. In this embodiment, the management server 2 collects a cycle time of each step from a corresponding terminal in the terminal group 10 and notifies each terminal (numerical controller 1) of information about a bottleneck.

A cycle time is an operating time of each step required for production of one completed item. If production of one completed item requires three parts to be subjected to machining by one machine tool and a time for machining on each of these parts is three minutes, for example, a cycle time of this machine tool is three minutes times three, which equals 9 minutes.

Figure 2:
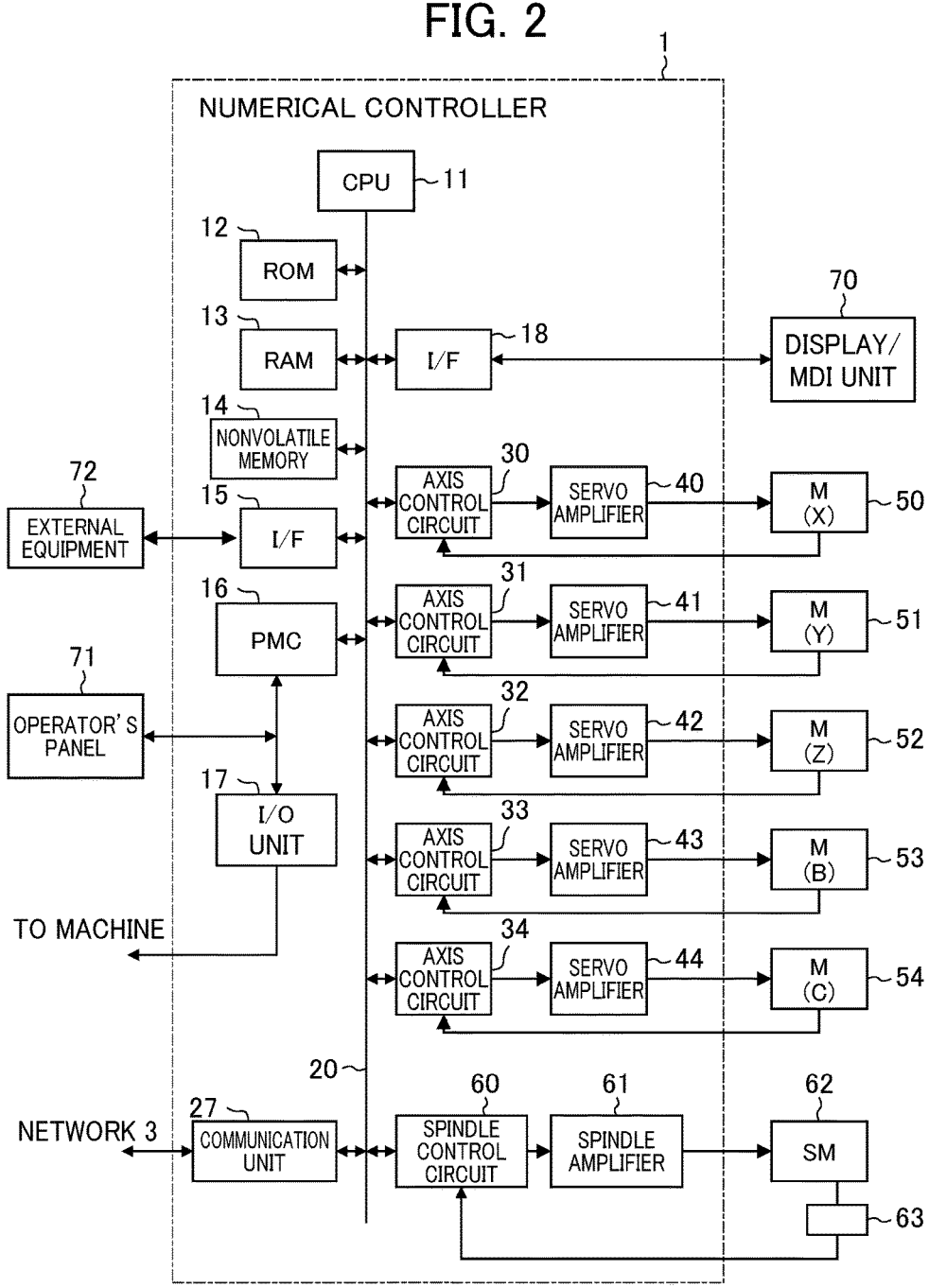
FIG. 2 is a block diagram showing the hardware configuration of a principal part of a numerical controller.

FIG. 2 is a block diagram showing the hardware configuration of a principal part of the numerical controller 1. The numerical controller 1 includes a CPU 11 as a processor that controls the entire numerical controller 1. The CPU 11 reads a system program stored in a ROM 12 through a bus 20 and controls the entire numerical controller 1 by following the read system program. A RAM 13 stores temporary calculated data, display data, and various types of data input by an operator through a display/MDI unit 70. Generally, access is made faster to a RAM than to a ROM. Thus, the CPU 11 may deploy the system program stored in the ROM 12 in advance on the RAM 13. Then, the CPU 11 may read the system program from the RAM 13 and execute the read system program. A nonvolatile memory 14 is a magnetic storage unit, a flash memory, an MRAM, FRAM, or an EEPROM, for example. Alternatively, the nonvolatile memory 14 is an SRAM or a DRAM backed up by a battery, for example. The nonvolatile memory 14 is configured as a nonvolatile memory to hold its storage state even after the numerical controller 1 is powered off. The nonvolatile memory 14 stores a machining program, etc. input through an interface 15, the display/MDI unit 70, or a communication unit 27.

The ROM 12 stores various system programs written in advance for executing processing in an edit mode required for generation and editing of a machining program and for executing processing for automatic operation. Various machining programs are input through the interface 15, the display/MDI unit 70, or the communication unit 27, and are stored into the nonvolatile memory 14. The interface 15 connects between the numerical controller 1 and external equipment 72. A machining program, various parameters, etc., are read from the external equipment 72 into the numerical controller 1. The machining program edited in the numerical controller 1 can he stored into an external storage through the external equipment 72. Specific examples of the interface 15 include an RS232C interface, a USB, an SATA interface, a PC card slot, a CF card slot, an SD card slot, Ethernet, and Wi-Fi. The interface 15 can be located on the display/MDI unit 70. Examples of the external equipment 72 include a computer, a USE memory, a CFast card, a CF card, and an SD card.

A programmable machine controller (PMC) 16 outputs a signal through an I/O unit 17 to an auxiliary device (such as an automatic tool change device) of a machine tool to control the auxiliary device by following a sequence program provided in the numerical controller 1. The PMC 16 accepts signals input through various switches, etc. of an operator's panel 71 arranged at the body of the machine tool, executes necessary signal processing, and transfers the processed signals to the CPU 11. Generally, the PMC 16 is also called a programmable logic controller (PLC). The operator's panel 71 is connected to the PMC 16. The operator's panel 71 may include a manual pulse generator, for example. The display/MDI unit 70 is a manual input unit with a display (display unit) and an operation unit such as a keyboard or a touch panel. An interface 18 is used for transmitting screen data to be displayed to the display of the display/MDI unit 70. The interface 18 is also used for receiving a command and data from the operation unit of the display/MDI unit 70 and transferring the received command and data to the CPU 11.

Axis control circuits 30 to 34 of corresponding axes receive movement command amounts of the corresponding axes given from the CPU 11, and output the commands on the corresponding axes to servo amplifiers 40 to 44 respectively. In response to receipt of these commands, the servo amplifiers 40 to 44 drive servo motors 50 to 54 of the corresponding axes respectively. The servo motors 50 to 54 of the corresponding axes each include a built-in position and speed detector. The servo motors 50 to 54 transmit position and speed feedback signals as feedbacks to the axis control circuits 30 to 34 respectively, thereby exerting position and speed feedback control.

A spindle control circuit 60 outputs a spindle speed signal to a spindle amplifier 61 in response to receipt of a spindle rotation command directed to the machine tool. In response to receipt of the spindle speed signal, the spindle amplifier 61 rotates a spindle motor 62 of the machine tool at a rotation speed designated by the command, thereby driving a tool. A pulse encoder 63 is coupled to the spindle motor 62 with a gear or a belt, for example. The pulse encoder 63 outputs a feedback pulse in synchronization with the rotation of a spindle. The feedback pulse passes through the bus 20 to be read by the CPU 11.

Figure 3:
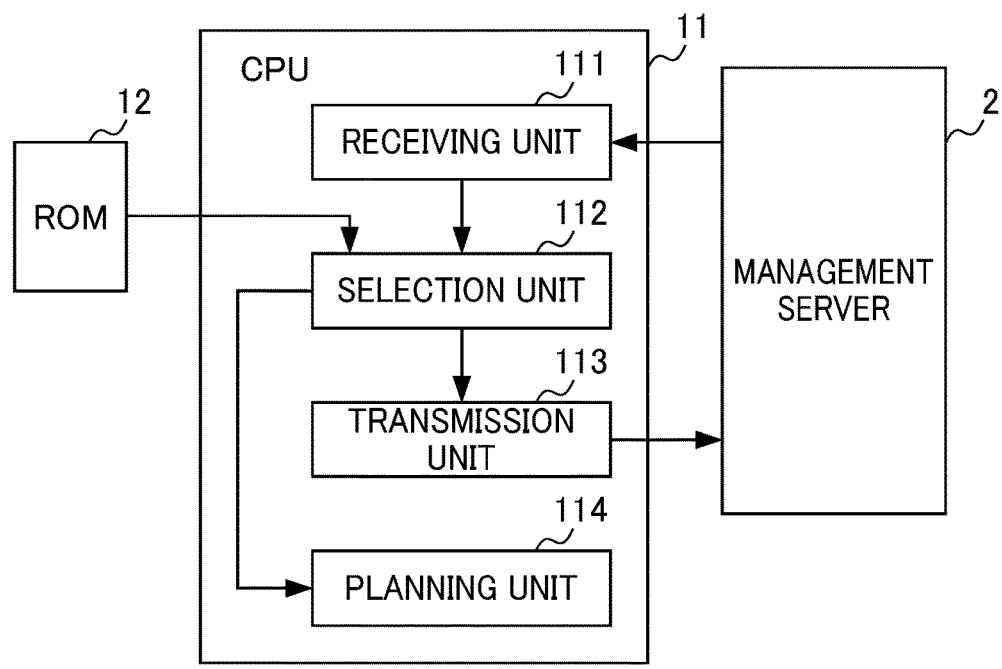
FIG. 3 is a block diagram showing the functional configuration of a CPU in the numerical controller.

FIG. 3 is a block diagram showing the functional configuration of the CPU 11 of the numerical controller 1. The CPU 11 includes a receiving unit 111, a selection unit 112, a transmission unit 113, and a planning unit 114. Each of these functional units is realized by execution of the system program stored in the ROM 12 by the CPU 11.

The ROM (storage unit) 12 stores multiple combinations of machining programs and parameters together with a first cycle time required for machining. As a specific example, the ROM 12 stores two or multiple types of combinations as follows adjusted in advance together with a machining time (first cycle time): "a parameter and a machining program for high-speed machining" and "a parameter and a machining program that are time-consuming but superior in terms of the lifetime of a tool and power consumption."

The receiving unit 111 accepts a cycle time (second cycle time) of a bottleneck step in a factory as a whole or in a flow to the completion of an item in which the numerical controller 1 including this receiving unit 111 is involved. More specifically, the receiving unit 111 receives the following from the management server 2: the second cycle time of the bottleneck step, and information indicating at least whether or not the bottleneck step is upstream or downstream from the numerical controller 1 including this receiving unit 111. The receiving unit 111 may accept input of the second cycle time by an operator.

The selection unit 112 selects a combination from multiple combinations of machining programs and parameters in the ROM 12. The selected combination is to extend the first cycle time to a range not exceeding the second cycle time of the bottleneck step. Specifically, the selection unit 112 compares the first cycle time of the numerical controller 1 including this selection unit 112 with the bottleneck second cycle time and extends a machining time to a range not affecting throughput of the factory as a whole, thereby extending the lifetime of a tool and reducing power consumption.

The transmission unit 113 transmits a current cycle time, specifically, the first cycle time corresponding to the combination of the machining program and the parameter selected by the selection unit 112, to the management server 2 at regular intervals or at a given timing.

The planning unit 114 moves a machining hour to a predetermined time period if the bottleneck step is downstream from the numerical controller 1 including this planning unit 114 and if a difference between the second cycle time and the first cycle time selected by the selection unit 112 exceeds a threshold. Specifically, before execution of the downstream step, the numerical controller 1 finishes its own step in advance within an optimum time period. For example, a time period of cheaper electricity charges is selected as the predetermined time period to contribute to power saving.

Figure 4:
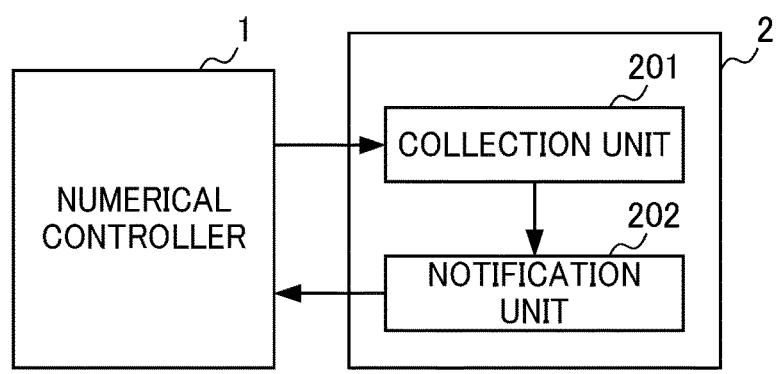
FIG. 4 is a block diagram showing the functional configuration of a management server.

FIG. 4 is a block diagram showing the functional configuration of the management server 2. The management server 2 includes a collection unit 201 and a notification unit 202.

The collection unit 201 collects the first cycle time from the numerical controller 1 responsible for a corresponding step. The collection unit 201 further collects cycle times from the other terminals in the terminal group 10 in a similar manner.

The notification unit 202 notifies the numerical controller 1 of a maximum as the bottleneck second cycle time among the cycle times of all steps including the first cycle time collected from the numerical controller 1 by the collection unit 201. Along with this notification, the notification unit 202 transmits information about the position of the bottleneck step to the numerical controller 1.

Figure 5:
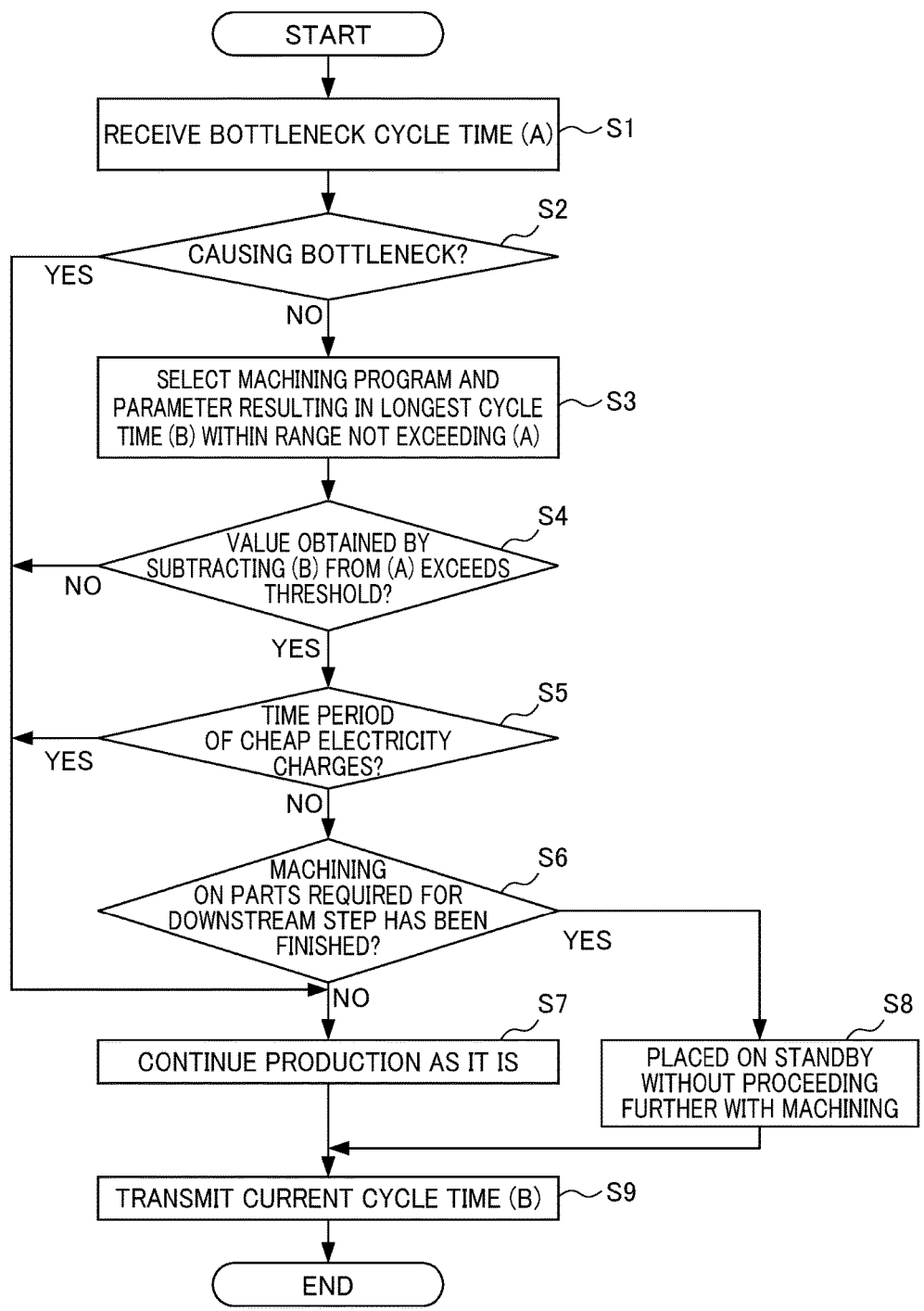
FIG. 5 is a flowchart showing a control method implemented by the numerical controller.

FIG. 5 is a flowchart showing a control method implemented by the numerical controller 1. This processing is executed repeatedly at regular intervals. In step S1, the receiving unit 111 receives a second cycle time (A) of a bottleneck step from the management server 2.

In step S2, the selection unit 112 determines whether or not a step controlled by the numerical controller 1 including this selection unit 112 is a bottleneck. If YES, the processing shifts to step S7. If NO, the processing shifts to step S3.

In step S3, the selection unit 112 compares cycle times corresponding to the multiple combinations of the machining programs and the parameters stored in the ROM 12 and the second cycle time (A) received in step S1. Then, the selection unit 112 selects a combination of a machining program and a parameter corresponding to a longest first cycle time (B) within a range not exceeding the second cycle time (A).

In step S4, the planning unit 114 determines whether or not a value obtained by subtracting the first cycle time (B) from the second cycle time (A) exceeds a threshold. If YES, the processing shifts to step S5. If NO, the processing shifts to step S7.

In step S5, the planning unit 114 determines whether or not a current time is within a predetermined time period of cheap electricity charges. If YES, the processing shifts to step S7. If NO, the processing shifts to step S6.

In step S6, the planning unit 114 determines whether or not machining on parts required until the predetermined time period comes for a bottleneck step downstream from the numerical controller 1 including this planning unit 114 has already been finished. If YES, the processing shifts to step S8. If NO, the processing shifts to step S7.

In step S7, the planning unit 114 continues production by following the selected machining program and parameter. In step S8, the planning unit 114 stops the machining and places the numerical controller 1 on standby until the predetermined time period comes. In step S9, the transmission unit 113 transmits the first cycle time (B) corresponding to the machining program and the parameter currently selected to the management server 2.

Figure 6:
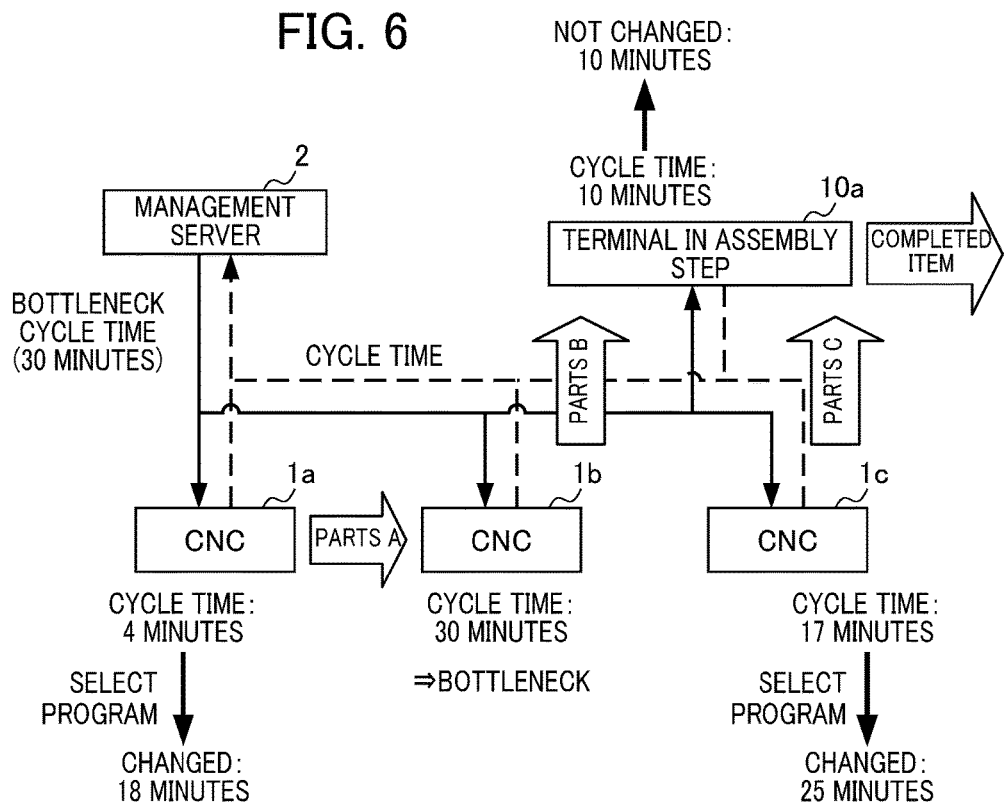
FIG. 6 shows an example of changing a cycle time in the numerical controller.

FIG. 6 shows an example of changing a cycle time in the numerical controller 1. In this example, in a machining step controlled by a numerical controller 1a, parts A is to be produced in a cycle time of four minutes. In a machining step controlled by a numerical controller 1b, the parts A are machined to produce parts B in a cycle time of 30 minutes. In a machining step controlled by a numerical controller 1c, parts C are produced in a cycle time of 17 minutes. In an assembly step where a terminal 10a is prepared, the parts B and C are assembled into a completed item in a cycle time of 10 minutes.

In this example, the machining step of the numerical controller 1b is a bottleneck. A bottleneck cycle time of 30 minutes among cycle times collected by the management server 2 from corresponding steps is transmitted to each terminal. The numerical controller 1a selects an optimum program for a cycle time of 30 minutes or less and changes the cycle time to 18 minutes. The numerical controller 1c also selects an optimum program for a cycle time of 30 minutes or less and changes the cycle time to 25 minutes. The cycle time of the assembly step is not changed. Meanwhile, a schedule of an operator may be adjusted based on the information about the bottleneck transmitted to the terminal 10a, for example.

As a result of the change in the cycle time of the numerical controller 1a and the change in the cycle time of the numerical controller 1c, the entire cycle time is increased from "4+30+10×44 minutes" to "18+30+10=58 minutes." However, the number of completed items as throughput per one hour does not change and remains at "1 hour/30 minutes=2." As understood from this, the numerical controller 1 changes a cycle time without changing throughput.

According to this embodiment, the numerical controller 1 allows a change to a machining program and a change to a parameter resulting in a different cycle time. If a machine tool controlled by the numerical controller 1 has redundant production capacity when the numerical controller 1 acquires a cycle time of a bottleneck step, the numerical controller 1 controls machining using a machining program and a parameter resulting in a long cycle time. By doing so, the numerical controller 1 can appropriately adjust a method of machining by the machine tool while maintaining throughput. As a result, the lifetime of a tool is extended and power consumption is reduced. Even if a bottleneck machine tool or a bottleneck step is changed due to facility reinforcement or a change in an item being produced, for example, the numerical controller 1 can still adjust a cycle time of each machine tool individually in response to the new bottleneck.

Further, the numerical controller 1 transmits a cycle time of the numerical controller 1 to the management server 2 and acquires information about a bottleneck from the management server 2. By doing so, the numerical controller 1 can adjust a cycle time automatically in real time.

If the production capacity of each machine tool controlled by the numerical controller 1 is excessively larger than the bottleneck production capacity, specifically, if a cycle time is considerably short, the numerical controller 1 sets a machining time period at late-night hours of cheap electricity charges, for example. By doing so, power consumption can be reduced. A threshold regarding a difference between cycle times used for shifting of a time period can be set by a user. For example, the threshold may be set at a time having a fixed ratio relative to a bottleneck cycle time.

Although an embodiment of the present invention has been described, the present invention is not to be limited to the above-described embodiment. The effects described in this embodiment are merely a list of most preferred effects resulting from the present invention. Effects achieved by the present invention are not to be limited to those described in this embodiment.

According to this embodiment, the selection unit 112 selects a longest cycle time not exceeding the second cycle time. However, this is not the only selection of a cycle time. To avoid a sudden change, a machining program and a parameter resulting in a one-step shorter cycle time may be selected, for example. As another example, in response to an external situation such as one where machining is required to be done at a given speed or more in preparation for replacement of a facility in the near future, a machining program and a parameter designated by an operator may be selected.

The control method implemented by the numerical controller 1 is realized by software. To realize the control method by software, programs constituting the software are installed on a computer (numerical controller 1). These programs may be stored in a removable medium and then distributed to a user. Alternatively, these programs may be distributed by being downloaded onto a computer of the user through a network.

EXPLANATION OF REFERENCE NUMERALS

1 Numerical controller
2 Management server
3 Network
10 Terminal group
11 CPU
12 ROM (storage unit)
201 Collection unit
202 Notification unit
100 Control system
111 Receiving unit
112 Selection unit
113 Transmission unit
114 Planning unit

What is claimed is:

1. A numerical controller comprising:
    a storage unit that stores multiple combinations of machining programs and parameters together with a first cycle time required for machining;
    a receiving unit that receives a second cycle time of a bottleneck step of another numerical controller; and
    a selection unit that compares the first cycle times corresponding to the multiple combinations of machining programs and parameters to the second cycle time, and selects a combination from the multiple combinations of the machining programs and the parameters corresponding to a longest first cycle time within a range not exceeding the second cycle time.

2. The numerical controller according to claim 1, comprising a transmission unit that transmits outwardly the first cycle time selected by the selection unit.

3. The numerical controller according to claim 2, wherein the transmission unit transmits outwardly, at regular intervals or at a given timing, the first cycle time selected by the selection unit to a management server.

4. The numerical controller according to claim 1, comprising a planning unit that moves a time for machining of the numerical controller to a predetermined time period if the bottleneck step of another numerical controller is downstream from a step currently being performed by the numerical controller and if a difference between the second cycle time and the first cycle time selected by the selection unit exceeds a threshold.

5. The numerical controller according to claim 4, wherein if the planning unit moves the time for machining to the predetermined time period, the planning unit causes machining to be stopped, and places the numerical controller on standby until the predetermined time period comes.

6. A control system comprising multiple numerical controllers and a management server,
each of the numerical controllers comprising:
a storage unit that stores multiple combinations of machining programs and parameters together with a first cycle time required for machining;
a receiving unit that receives a second cycle time about a bottleneck machine tool;
a selection unit that compares the first cycle times corresponding to the multiple combinations of machining programs and parameters to the second cycle time, and selects a combination from the multiple combinations of the machining programs and the parameters corresponding to a longest first cycle time within a range not exceeding the second cycle time; and
a transmission unit that transmits outwardly the first cycle time selected by the selection unit,
the management server comprising:
a collection unit that collects the first cycle time from each of the numerical controllers; and
a notification unit that notifies each of the numerical controllers of the second cycle time which is set as a maximum cycle time among cycle times of all steps, and the cycle times of all steps including the first cycle time collected by the collection unit.

7. The control system according to claim 6, wherein each of the numerical controllers comprises a planning unit that moves a time for machining to a predetermined time period if a difference between the second cycle time and the first cycle time selected by the selection unit exceeds a threshold.

8. A control method executed by a numerical controller that stores multiple combinations of machining programs and parameters together with a first cycle time required for machining, the control method comprising:
a receiving step of receiving a second cycle time about a bottleneck step of another numerical controller; and
a selection step of comparing the first cycle times corresponding to the multiple combinations of machining programs and parameters to the second cycle time, and selecting a combination from the multiple combinations of the machining programs and the parameters corresponding to a longest first cycle time within a range not exceeding the second cycle time.

9. The control method according to claim 8, further comprising a planning step of moving a time for machining to a predetermined time period if a difference between the second cycle time and the first cycle time selected in said selection step exceeds a threshold.

10. A non-transitory computer-readable medium encoded with a control program for causing a numerical controller to execute a control method, the numerical controller storing multiple combinations of machining programs and parameters together with a first cycle time required for machining, the control method comprising:
a receiving step of receiving a second cycle time about a bottleneck step of another numerical controller; and
a selection step of comparing the first cycle times corresponding to the multiple combinations of machining programs and parameters to the second cycle time, and selecting a combination from the multiple combinations of the machining programs and the parameters corresponding to a longest first cycle time within a range not exceeding the second cycle time.

11. The non-transitory computer-readable medium according to claim 10, wherein the control method further comprises a planning step of moving a time for machining to a predetermined time period if a difference between the second cycle time and the first cycle time selected in said selection step exceeds a threshold.

* * * * *